T. P. Sink,
Oyster Dredge.
Nº 65,442. Patented June 4, 1867.
Fig. 1.
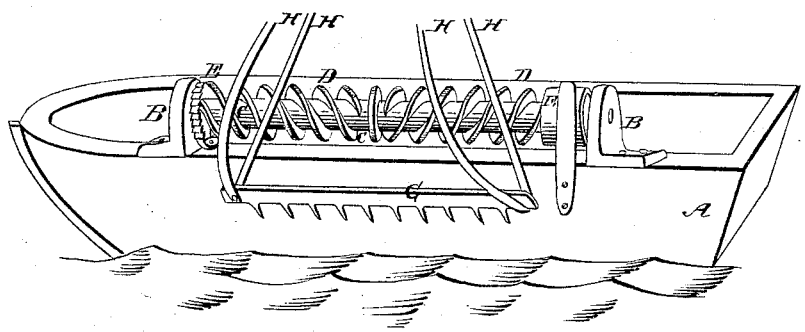
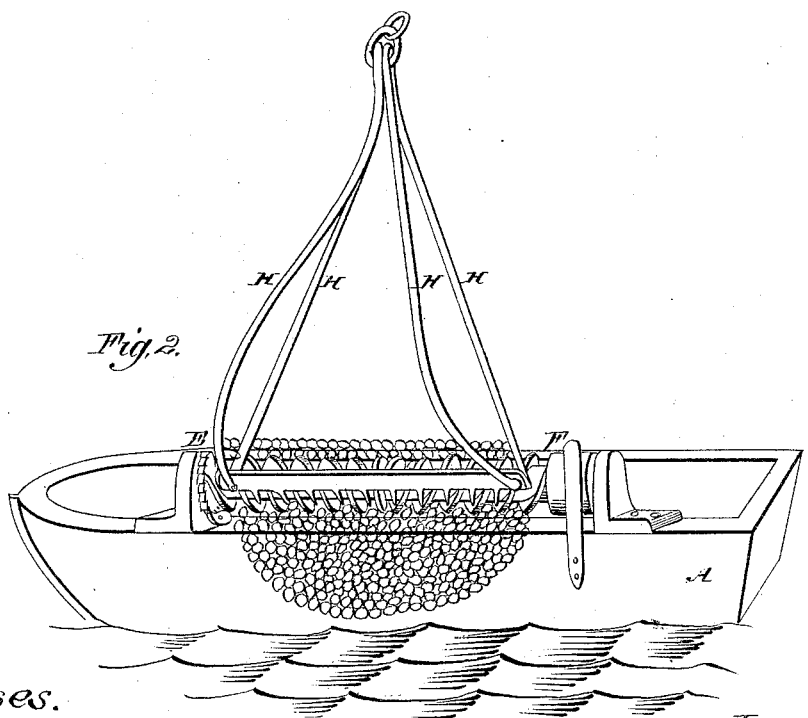
Fig. 2.
Witnesses.
William Graf
Thos Welham
Inventor.
T. P. Sink

United States Patent Office.

THOMAS P. SINK, OF FAIRTON, NEW JERSEY.

*Letters Patent No. 65,442, dated June 4, 1867.*

IMPROVED ROLLER FOR BOARDING OYSTER-DREDGES.

*The Schedule referred to in these Letters Patent and making part of the same.*

TO ALL WHOM IT MAY CONCERN:

Be it known that I, THOMAS P. SINK, of Fairton, county of Cumberland, and State of New Jersey, have invented new and useful improvements in Screw-Shaped Rollers for Boarding an Oyster-Dredge; and I do hereby declare the following to be an exact description thereof, reference being had to the accompanying drawings, and to the letters of reference marked thereon, making a part of this specification, in which—

Figure 1 represents a view of the dredge or rake, and the screw-roller on the boat.

Figure 2 represents the dredge raised, with the teeth in the roller to unload the oysters.

The nature of my invention consists in the rollers with flanges running toward the centre.

A represents the boat, B B the uprights that support the screw-roller C. The screw-roller C has flanges D D, extending from the centre to extremities on each end, as a right and left-hand screw. And the object of the double spiral screw on the roller is to board an oyster-dredge, and dispense with what is commonly called the cutters attached to the dredges, and answer the purpose better for raising or lifting the teeth over the roller as commonly used. A ratchet, E, is at one end of the roller, and the other end F is smooth for the rope to operate on that draws up the dredge that is formed of a rake, G, and iron bars H as commonly used.

What I claim as my invention, and desire to secure by Letters Patent, is—

The right and left-hand screw-roller as attached to the gunwale of an oyster-boat for the purpose of boarding an oyster-dredge, as herein described.

THOMAS P. SINK.

Witnesses:
JAS. CAMPBELL Jr.,
THOS. WELHAM.